United States Patent [19]
Takatori et al.

[11] Patent Number: 5,231,678
[45] Date of Patent: Jul. 27, 1993

[54] CONFIGURATION RECOGNITION SYSTEM CALCULATING A THREE-DIMENSIONAL DISTANCE TO AN OBJECT BY DETECTING CROSS POINTS PROJECTED ON THE OBJECT

[75] Inventors: Sunao Takatori; Ryohei Kumagai; Koji Matsumoto; Makoto Yamamoto, all of Tokyo, Japan

[73] Assignee: Ezel, Inc., Tokyo, Japan

[21] Appl. No.: 831,095

[22] Filed: Feb. 10, 1992

Related U.S. Application Data

[63] Continuation of Ser. No. 608,740, Nov. 5, 1990, abandoned.

[30] Foreign Application Priority Data

Nov. 15, 1989 [JP] Japan .................................. 1-296677

[51] Int. Cl.⁵ .......................... G06K 9/46; G06K 9/44
[52] U.S. Cl. .......................................... 382/25; 382/1; 382/55; 356/376
[58] Field of Search ................. 382/1, 25, 55; 356/1, 356/2, 376

[56] References Cited

U.S. PATENT DOCUMENTS

| | | | |
|---|---|---|---|
| 3,735,349 | 5/1973 | Beun et al. | 382/55 |
| 4,202,630 | 5/1980 | Suzuki et al. | 356/376 |
| 4,313,678 | 2/1982 | Colvocoresses | 356/376 |
| 4,508,452 | 4/1985 | DiMatteo et al. | 382/1 |
| 4,525,858 | 6/1985 | Cline et al. | 382/1 |
| 4,668,094 | 5/1987 | Matsumoto et al. | 356/376 |
| 4,668,984 | 5/1987 | Rosenfeld | 356/376 |
| 4,700,398 | 10/1987 | Mizuno et al. | 382/1 |
| 4,742,237 | 5/1988 | Ozawa | 356/376 |
| 4,752,964 | 6/1988 | Okada et al. | 382/1 |
| 4,757,379 | 7/1988 | Wright | 356/376 |
| 4,786,925 | 11/1988 | Landwehr | 356/376 |
| 4,790,023 | 12/1988 | Matsui et al. | 382/25 |
| 4,791,482 | 12/1988 | Barry et al. | 356/376 |
| 4,802,759 | 2/1989 | Matsumoto et al. | 356/376 |
| 4,825,263 | 4/1989 | Desjardins et al. | 356/376 |
| 4,846,577 | 7/1989 | Grindon | 356/376 |
| 4,858,157 | 8/1989 | Murai et al. | 356/2 |
| 4,900,128 | 2/1990 | Lom | 382/1 |

OTHER PUBLICATIONS

Azriel Rosenfeld and Avinash C. Kak, "Digital Picture Processing", Second Edition vol. 2, pp. 70–73, 232–240, 245–250, and 287–289.

Primary Examiner—Leo H. Boudreau
Assistant Examiner—Christopher S. Kelley
Attorney, Agent, or Firm—Cushman, Darby & Cushman

[57] ABSTRACT

A 3-dimensional configuration recognition system comprising: a means for projecting a checker pattern onto a surface of a solid object; a means for thinning said checker pattern and for generating a thinned checker pattern; a means for extracting cross points of said thinned checker pattern; a couple of means for detecting 2-dimensional coordinate of said cross points; and a means for calculating 3-dimensional coordinate of said cross points from said 2-dimensional coordinate and positions of said couple of means.

7 Claims, 2 Drawing Sheets

CONFIGURATION RECOGNITION SYSTEM CALCULATING A THREE-DIMENSIONAL DISTANCE TO AN OBJECT BY DETECTING CROSS POINTS PROJECTED ON THE OBJECT

This is a continuation of application Ser. No. 07/608,740, filed on Nov. 5, 1990, which was abandoned upon the filing hereof.

FIELD OF THE INVENTION

The present invention relates to a 3-dimensional configuration recognition system for the recognition of a 3-dimensional surface.

PRIOR ARTS

Conventionally, a system which obtains 3-dimensional coordinates of a surface of a solid from a light projected onto the surface, is known as a recognition system of a 3-dimensional configuration. In the above system, the light is emitted through slits and is moved over the surface. The location of the above light is detected by two cameras during this movement. The location of the light, i.e., 3-dimensional coordinates of the surface is calculated geometrically from the distance between 2 cameras and an angle formed with a line connecting the above cameras and a ray of light.

SUMMARY OF THE INVENTION

As to such conventional 3-dimensional configuration recognition system, transit speed of a light should be lower than a predetermined value for accurate detection of the location of a light at the surface. Therefore, recognition speed is limited.

The present invention is invented in view of the above points of the prior art and has an object to provide a system recognizable of 3-dimensional configuration at a high speed.

A 3-dimensional configuration recognition system according to the present invention comprises:

a means for projecting a checker pattern onto a surface of a solid object;

a means for thinning said checker pattern and for generating a thinned checker pattern;

a means for extracting cross points of said thinned checker pattern;

a couple of means for detecting 2-dimensional coordinate of said cross points; and a means for calculating 3-dimensional coordinate of said cross points from said 2-dimensional coordinate and positions of said couple of means.

PREFERRED EMBODIMENT OF THE PRESENT INVENTION

Hereinafter, an embodiment of the present invention is described with referring to the attached drawings.

Figure 2:
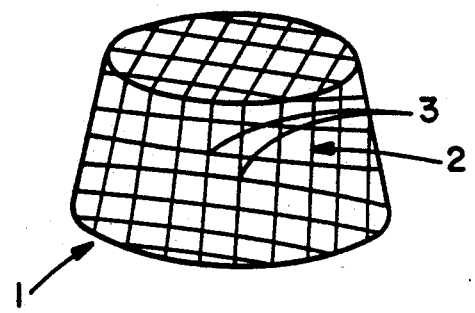
FIG. 2 shows a squint diagram showing an example of a 3-dimensional configuration to be recognized.

FIG. 2 shows a truncated cone 1 as an example of a 3-dimensional configuration to be recognized. As it is described later, checker pattern 2 is projected onto the surface of the above truncated cone 1, according to the present embodiment. The surface shape of the above truncated cone 1 is recognized by calculating 3-dimensional coordinates of cross points of the above checker pattern 2.

Figure 3:
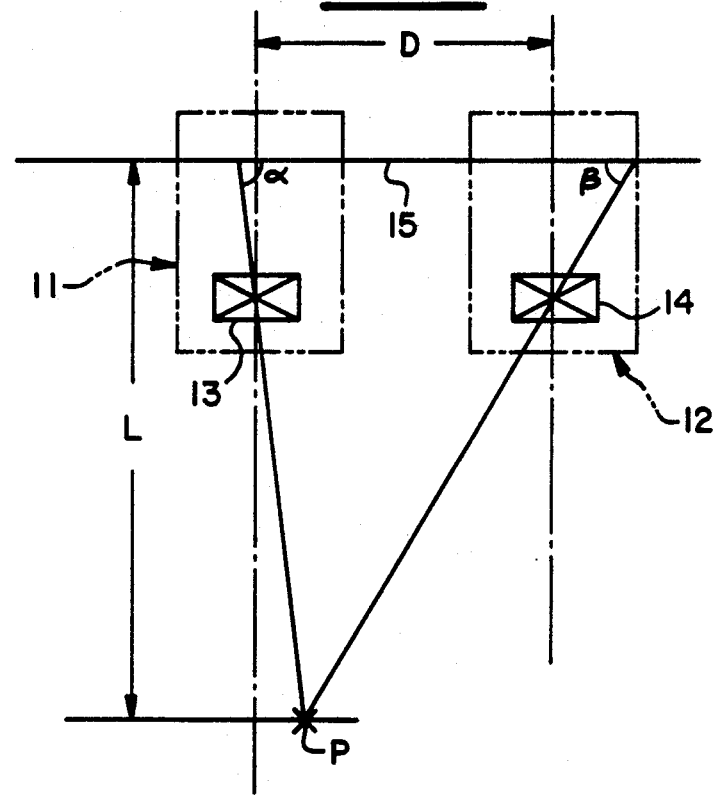
FIG. 3 shows a diagram showing the arrangement of cameras.

FIG. 3 shows two typical cameras 11 and 12 for detecting 2-dimensional coordinates of cross points 3 on the surface. The above cameras form an image of a point P to be detected on the screen 15 by the lenses 13 and 14. The relationship among the following lines and angles is as follows:

$$L \cot\alpha + L \cot\beta = D$$

where distance between centers of lenses 13 and 14 is D; distance from screen 15 to a point P is L; an angle formed with a line connecting a center point of a lens 13 and a point P and a side of the screen 15 is $\alpha$; and an angle formed with a line connecting a center point of a lens 14 and a point P and a side of the screen 15 is $\beta$. Then distance L is calculated by the following formula:

$$L = D/(\cot\alpha + \cot\beta) \qquad (1)$$

This distance L is used at step 62 for detecting 3-dimensional coordinates, as it is described hereinafter.

Figure 1:
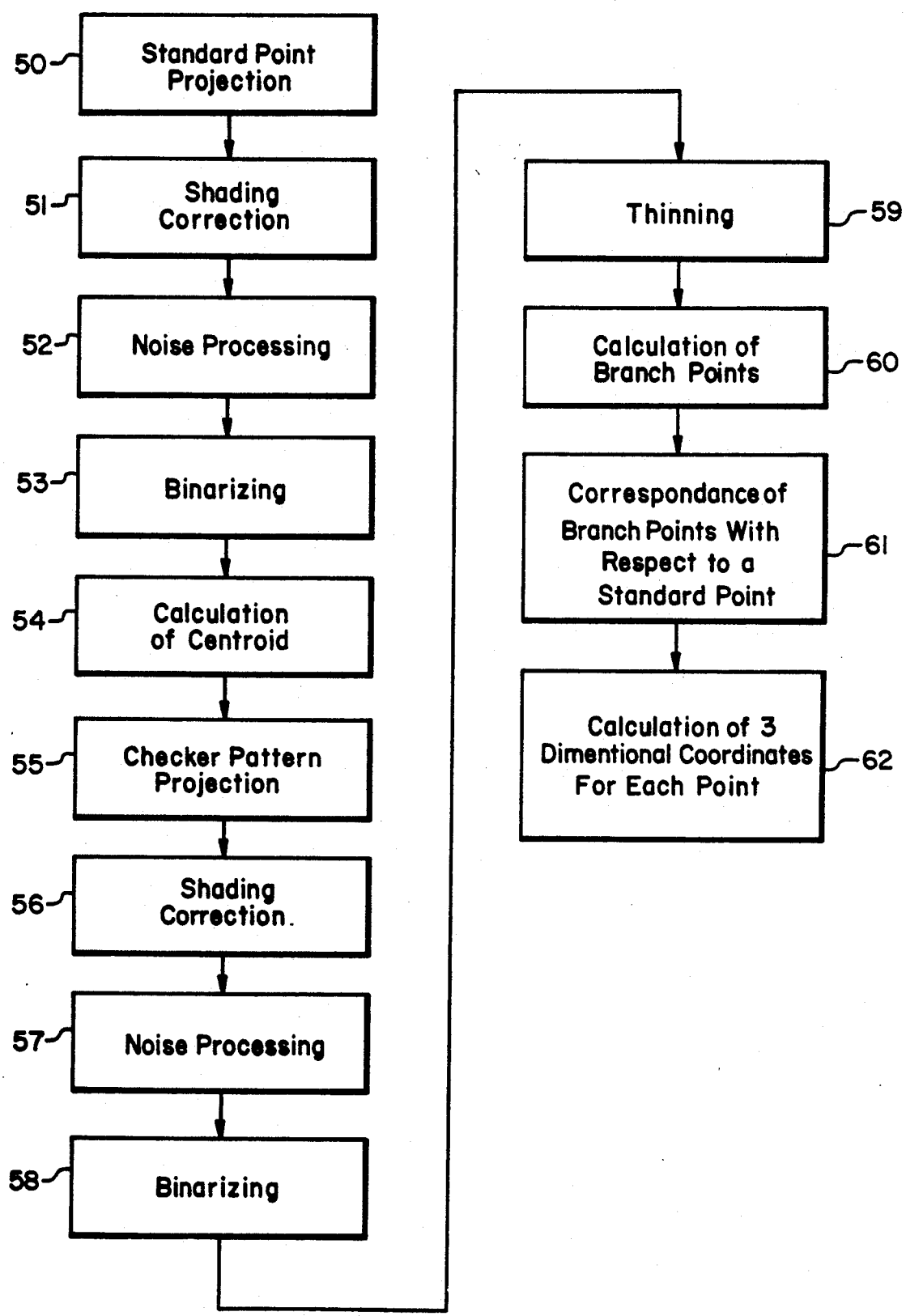
FIG. 1 shows a flow chart showing the procedure of the recognition of the surface shape of a 3-dimensional configuration.

FIG. 1 shows the procedure for the recognition of the configuration of the surface.

At step 50, a black spot is projected as a reference point onto the surface to be recognized. This reference point is used for obtaining 3-dimensional coordinates of each point on the surface at step 61.

At step 51, shading correction is performed for the image obtained by cameras 11 and 12. Shading correction is performed so as to unify the luminance distribution of the whole image, as is generally known. Input image is segmented into a plurality of areas and optimized thresholds are calculated for each area so that the image has equivalent luminance as a whole.

At step 52, smoothing processing, i.e., median filter, etc., is performed so as to perform noise processing while preserving the edges. As the result, noise in the image is deleted without dulling the edges. Such image is binarized at step 53 so that a numerical value of "1" or "0" is given to all pixels as their luminance.

At step 54, the coordinate of a centroid of a spot projected onto the reference point is calculated for detecting the position of the reference point obtained at step 50. This position of the centroid is calculated, as is generally known, by dividing the moment around the predetermined point of a spot by the area of the spot.

At step 55, 1 checker pattern is projected onto the surface of the solid. This checker pattern is formed, for example, by a meshed material in front of an illuminant and projecting the mesh pattern onto the surface. That is, this checker pattern is drawn with black lines onto the surface.

Shading correction is performed for the above obtained checker pattern at step 56, and noise reduction and binarizing are performed at step 57 and 58, respectively. Here, processings performed at steps 56, 57 and 58 are the same as that of steps 51, 52 and 53.

At step 59, thinning is performed for the checker pattern obtained from the processing up to step 58. A configuration is converted into a line configuration with one pixel width by the above thinning.

At step 60, branch points are extracted from the thinned checker pattern. These branch points are extracted through, for example, evaluating eight pixels surrounding a center pixel with pixel value of "1" in the convolution of a size of $3 \times 3$.

Figure 4:
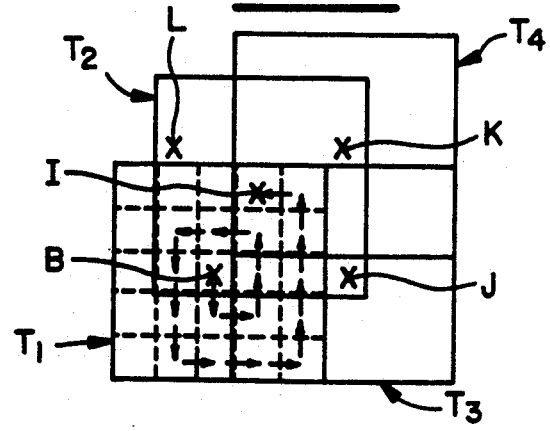
FIG. 4 shows a diagram showing the branch point detection processing.
2 Checker Pattern
3 Cross Point

At step 61, a relationship between each point to the reference point is obtained. This is fully described with reference to FIG. 4.

First, a convolution T1 is taken into consideration with its center on the reference point B, arranging 5 pixels in the vertical direction and 5 pixels in the horizontal direction. Two cameras 11 and 12 (shown in FIG. 3) detect branch points on the above convolution T1, by examining each pixel successively in a spiral order, staring from the reference point B, as shown by an arrow in FIG. 4. The locations of branch points detected by each camera 11, 12 are stored in a memory, which is not shown in the figure, as the relative location to the reference point B. That is, two cameras 11 and 12 define the relationship between equivalent points to each other.

Next, a $5 \times 5$ convolution T2 is taken into a consideration as described above, with its center of a branch point I which has already been detected. According to this convolution T2, branch points are detected by examining pixels successively in a spiral order. Here it is assumed that there are 4 branch points I, J, K and L, from which branch point J is detected first. In this case, the same branch point detection with respect to the next convolution T3 centering the branch point J is repeatedly performed. When any new branch point would not be discovered within the convolution T3, branch point detection with respect to the convolution T4 centering a branch point K in the convolution T2 is performed. On the other hand, when no branch point is detected with respect to a $5 \times 5$ convolution, a $10 \times 10$ convolution is taken and same branch point detection is performed.

By repeating the above processing, branch point detection for all pixels is performed so that the locations of all branch points are to be stored in a memory.

At step 62, 3-dimensional coordinate for each branch point is calculated. According to step 61, the locations of each branch point detected by each camera 11, 12 are stored as the angles $\alpha$ and $\beta$ as shown in FIG. 3. At step 62, distance L (Z coordinate) is calculated by inputting the values of the above angles $\alpha$ and $\beta$ into the above formula. On the other hand, x and y coordinates are simply calculated by detecting the locations of each pixel, since a plane (x-y plane) perpendicular to the direction of distance L is parallel to a screen 15, and is on the same plane as that of the above convolution.

Accordingly, x, y and z coordinates of each branch point, i.e., cross points of the checker pattern, are calculated so as to recognize the surface shape of a 3-dimensional configuration.

According to the present invention, as mentioned above, it is possible to obtain the advantage that a high speed recognition of 3-dimensional configuration becomes possible.

What is claimed is:

1. A 3-dimensional configuration recognition system comprising:
    a means for projecting a checker pattern having branch points onto a surface of a solid object;
    means for converting said checker pattern into a processed form;
    a means for performing a thinning operation on said processed from checker pattern and for generating a thinned checker pattern;
    a means for extracting branch points of said thinned checker pattern;
    at least two means, at different respective and separated positions, each for detecting separate 2-dimensional coordinates of said branch points, each said means including:
    a) means for scanning a current convolution area and determining branch points therein,
    b) memory means for storing positions of the determined branch points; and
    c) means for determining a new convolution area centered on one of said branch points;
    a means for calculating 3-dimensional coordinates of said cross points from both said separate 2-dimensional coordinates and said positions of said at least two detecting means.

2. A system as in claim 1, wherein each said detecting means is at a different location, and each said detecting means determines angle of incidence with respect to a reference line intersecting each said cross point.

3. A system of claim 2, wherein said detecting means include cameras.

4. A system as in claim 2, wherein said 3-dimensional coordinates are determined using said angles of incidence to find two of said coordinates, and finding a third coordinate, L, using the formula $L = D/(\cot\alpha + \cot\beta)$ where $\alpha$ and $\beta$ are said angles of incidence respectively, and D is a distance between said detecting means.

5. A system according to claim 1, wherein said scanning means scans said convolution area in a spiral pattern.

6. A system as in claim 5, wherein said new convolution area is centered on the first cross point found during the spiral scanning.

7. A system as in claim 1, further comprising means for setting a larger convolution a area that said current convolution area if no branch points are found within the current convolution area.

\* \* \* \* \*